US012724402B2

(12) United States Patent
Hoernicke et al.

(10) Patent No.: US 12,724,402 B2
(45) Date of Patent: Sep. 1, 2026

(54) SYSTEM AND METHOD FOR REVERSE ENGINEERING A MODULE FOR A MODULAR INDUSTRIAL PLANT

(71) Applicant: ABB Schweiz AG, Baden (CH)

(72) Inventors: Mario Hoernicke, Landau (DE); Katharina Stark, Weinheim (DE); Roland Braun, Niederkassel Luelsdorf (DE); Michael Vach, Wilhelmsfeld (DE); Sten Gruener, Laudenbach (DE); Nicolai Schoch, Heidelberg (DE); Marcel Dix, Mannheim (DE)

(73) Assignee: ABB Schweiz AG, Baden (CH)

( * ) Notice: Subject to any disclaimer, the term of this patent is extended or adjusted under 35 U.S.C. 154(b) by 850 days.

(21) Appl. No.: 17/523,958

(22) Filed: Nov. 11, 2021

(65) Prior Publication Data

US 2022/0147029 A1 May 12, 2022

(30) Foreign Application Priority Data

Nov. 11, 2020 (EP) .................................... 20206857

(51) Int. Cl.
*G05B 19/418* (2006.01)
*G06N 5/04* (2023.01)

(52) U.S. Cl.
CPC ... *G05B 19/41845* (2013.01); *G05B 19/4183* (2013.01); *G05B 19/41865* (2013.01); *G05B 19/4188* (2013.01); *G06N 5/04* (2013.01)

(58) Field of Classification Search
CPC .......... G05B 19/41845; G05B 19/4183; G05B 19/41865; G05B 19/4188;
(Continued)

(56) References Cited

U.S. PATENT DOCUMENTS

2004/0030741 A1* 2/2004 Wolton ................. G06F 16/954
709/202
2006/0212515 A1 9/2006 Shienbrood et al.
(Continued)

FOREIGN PATENT DOCUMENTS

CN 101893861 A 11/2010
CN 104570822 A 4/2015
(Continued)

OTHER PUBLICATIONS

Bernshausen et al., "Namur Module Type Package—Definition," *atp edition*, 58 (1-2): 72-81 (Jan. 1, 2016).
(Continued)

*Primary Examiner* — Robert E Fennema
*Assistant Examiner* — Marzia T Monty
(74) *Attorney, Agent, or Firm* — Fitch Even Tabin & Flannery LLP

(57) ABSTRACT

A computer-implemented method for reverse engineering control logic of a module for a modular industrial plant includes: obtaining module-related data including runtime data relating to prior use of the module during a timeperiod in which at least one piece of equipment of the module transitions from a first equipment state to a second equipment state, the runtime data including tags indicating the equipment state of the equipment at a plurality of timepoints during the timeperiod; and inferring from the module-related data one or more equipment state transition conditions causing the equipment to transition from the first equipment state to the second equipment state.

18 Claims, 3 Drawing Sheets

(58) Field of Classification Search
CPC .... G05B 19/41875; G05B 2219/32368; G05B 19/41885; G06N 5/04; Y02P 90/30; G06Q 50/04; G06Q 10/063
See application file for complete search history.

(56) References Cited

U.S. PATENT DOCUMENTS

| | | | | |
|---|---|---|---|---|
| 2007/0106761 | A1 | 5/2007 | Beoughter et al. | |
| 2009/0083649 | A1 * | 3/2009 | Baier | G05B 17/02 715/771 |
| 2010/0082141 | A1 * | 4/2010 | Solimano | G06Q 10/00 700/103 |
| 2013/0145597 | A1 * | 6/2013 | Kodama | G05B 19/41805 29/428 |
| 2013/0253709 | A1 * | 9/2013 | Renggli | G05D 23/1919 700/278 |
| 2015/0018977 | A1 | 1/2015 | Law et al. | |
| 2015/0105875 | A1 | 4/2015 | Tran et al. | |
| 2015/0160098 | A1 * | 6/2015 | Noda | G01M 99/00 702/35 |
| 2016/0132048 | A1 * | 5/2016 | Kambe | G05B 19/418 700/87 |
| 2016/0290119 | A1 * | 10/2016 | Tunc | G05B 19/0421 |
| 2017/0111223 | A1 * | 4/2017 | Matni | H04L 49/552 |
| 2018/0046164 | A1 * | 2/2018 | Drees | G05B 13/021 |
| 2018/0131560 | A1 * | 5/2018 | Cheng | H04L 43/0817 |
| 2019/0129395 | A1 * | 5/2019 | Niemiec | G05B 23/0235 |
| 2019/0207814 | A1 | 7/2019 | Jain et al. | |
| 2019/0302744 | A1 * | 10/2019 | Monti | G05D 1/0212 |
| 2020/0254670 | A1 * | 8/2020 | Horiuchi | G06N 3/045 |

FOREIGN PATENT DOCUMENTS

| | | | |
|---|---|---|---|
| CN | 106843166 | A | 6/2017 |
| CN | 107193271 | A | 9/2017 |
| CN | 111580445 | A | 8/2020 |
| EP | 2294487 | A1 | 3/2011 |
| WO | WO 2014/138949 | A1 | 9/2014 |
| WO | WO 2017/007480 | A1 | 1/2017 |
| WO | WO 2019/117852 | A1 | 6/2019 |

OTHER PUBLICATIONS

Bloch et al., "State-based control of process services within modular process plants," *51st CIRP Conference on Manufacturing Systems*, Procedia CIRP 72, 1088-1093 (2018).

Hoernicke et al., "Modular Process Plants: Part 2—Plant Orchestration and Pilot Application," *ABB Review*, 03(2019): 30-35 (Aug. 2019).

Huffman, "Benefits of State Based Control," *ABB Inc*., White Paper (Feb. 16, 2009).

Verein Deutscher Ingenieure E.V., "Automation engineering of modular systems in the process industry—General concept and interfaces," VDI/DE/NAMUR 2658 Blatt 1, 36 pp. (Oct. 2019).

Verein Deutscher Ingenieure E.V., "Automation engineering of modular systems in the process industry—Modelling of human-machine-interfaces," VDI/DE/NAMUR 2658 Blatt 2, 32 pp. (Nov. 2019).

Yang et al., "Comprehensive Degradation Assessment for Urban Rail Traction Power Supply Equipment Considering Different Operation State," *2018 Prognostics and System Health Management Conference* (*PHM-Chongqing*), 399-404 (Oct. 26-28, 2018).

Zhang, "Virtual assembly simulation and optimization of key parts of steam turbine based on reverse engineering," dissertation, Harbin Institute of Technology, 79 pp. (Feb. 15, 2017).

The Patent Office of the People's Republic of China, Office Action in Chinese Patent Application No. 202111319986.5, 10 pp. (Apr. 2, 2024).

Zvei, "White Paper—Module-Based Production in the Process Industry—Effects on Automation in the "Industrie 4.0" Environment," Mar. 2015, pp. 1-36, ZVEI—Zentralverband Elektrotechnik-und Elektronikindustrie e.V., Frankfurt, Germany.

Bloch Henry et al, "Modulares Engineering 1-15—Auf Knopfdruck aus dem P&ID zum MTP," Mar. 2109, pp. 1-4, 2021 Vogel Communications Group, Würzburg, Germany, Retrieved from the Internet: <URL: https://www.process.vogel.de/auf-knopfdruck-aus-dem-pid-zum-mtp-a-815517/.

Michael Vach et al, "Management of a company-wide module pool for modular plants," 2020 25th IEEE International Conference on Emerging Technologies and Factory Automation (ETFA), Sep. 2020, pp. 1393-1396, IEEE, Vienna, Austria.

Prahofen et al., "Reverse Engineering and Visualization of the Reactive Behavior of PLC Applications," *11th IEEE International Conference on Industrial Informatics* (*INDIN*), 564-571 (Jul. 29, 2013).

Schatz et al., "Trace-Guided Synthesis of Reactive Behavior Models of Programmable Logic Controllers," *39th Euromicro Conference on Software Engineering and Advanced Applications*, 260-267 (Sep. 4, 2013).

Wikipedia, "Reverse Engineering," article, downloaded from the Internet at: https://en.wikipedia.org/w/index.php?title=Reverse_engineering&oldid=986651339, 15 pp. (Nov. 2, 2020).

European Patent Office, Office Action in European Patent Application No. 20206857.3, 8 pp. (May 15, 2025).

* cited by examiner

SYSTEM AND METHOD FOR REVERSE ENGINEERING A MODULE FOR A MODULAR INDUSTRIAL PLANT

CROSS-REFERENCE TO PRIOR APPLICATION

Priority is claimed to European Patent Application No. EP 20 206 857.3, filed on Nov. 11, 2020, the entire disclosure of which is hereby incorporated by reference herein.

FIELD

One or more embodiments of the present invention may relate to methods and systems for reverse engineering control logic of modules for modular industrial plants.

BACKGROUND

The Modular Type Package (MTP) standard in the field of modular automation systems creates a framework for interoperability between modules and the orchestration system, allowing industrial process plants to be built up and engineered in a more modular way, with the goal of simplifying process plant engineering and life cycle management. These advantages are realized by prefabricated and well-tested modules, called PEAs (Process Equipment Assembly) that can easily be put together in different combinations so that different recipes can be realized.

Modular plants are gradually becoming more and more established and the community agrees to the miscellaneous benefits provided, not only with respect to development cost but also with respect to time and material efforts. For control system replacement, especially in older and third-party modules, where the description of the control system might not be present, a method is needed to reverse engineer the behaviour of the control system and automatically create the necessary engineering information for the replacement.

SUMMARY

One or more embodiments of the present invention may provide a

There is therefore a need for ways to facilitate the reverse engineering of modules for modular industrial plants. This need is met by the subject-matter of the independent claims. Optional features are set forth by the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
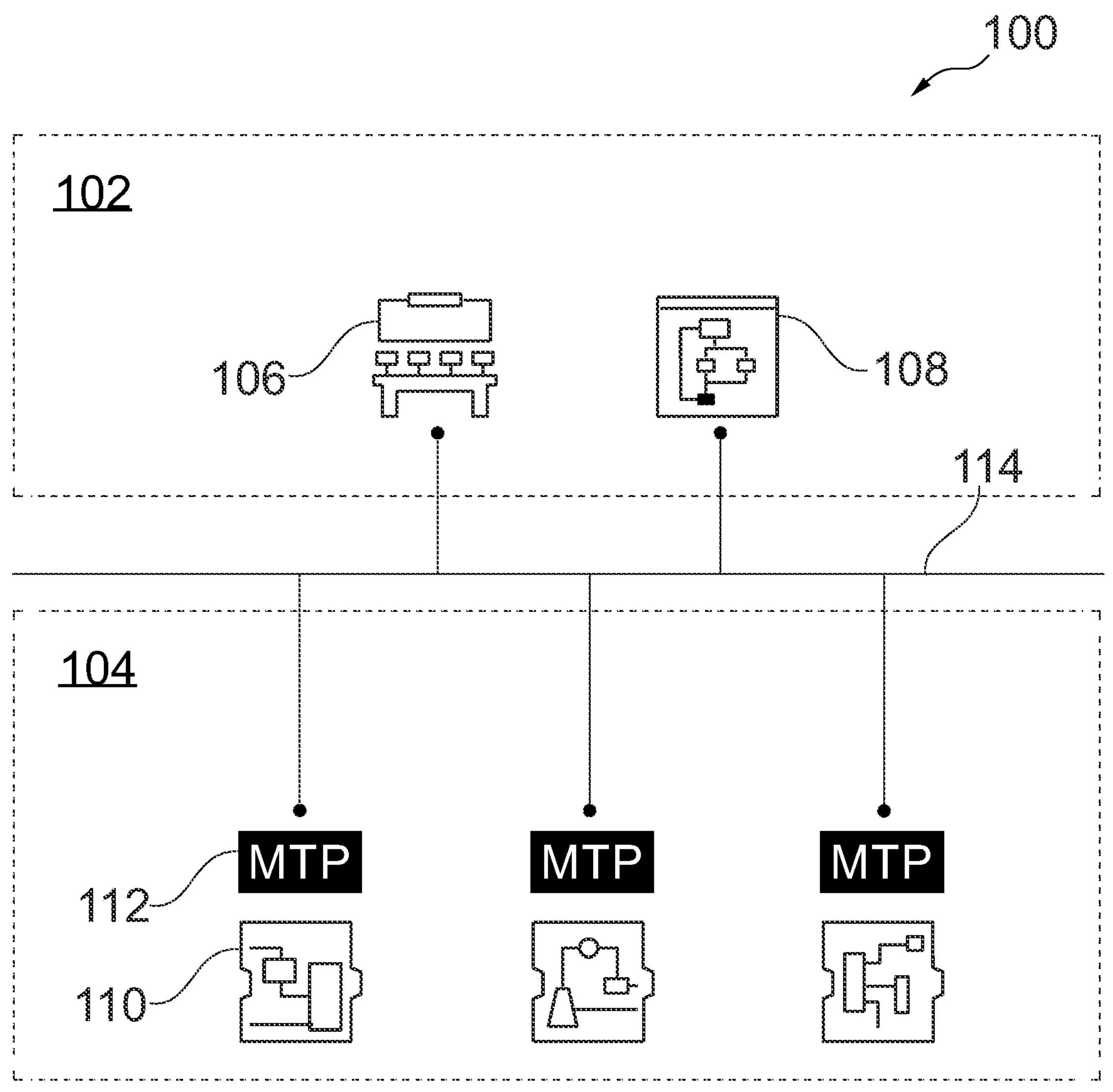
FIG. 1 illustrates a modular industrial plant.

According to a first aspect, there is provided a computer-implemented method for reverse engineering control logic of a module for a modular industrial plant. The method comprises: obtaining module-related data including runtime data relating to prior use of the module during a timeperiod in which at least one piece of equipment of the module transitions from a first equipment state to a second equipment state, the runtime data including tags indicating the equipment state of the equipment at a plurality of timepoints during the timeperiod; and inferring from the module-related data one or more equipment state transition conditions causing the equipment to transition from the first equipment state to the second equipment state.

The present disclosure thus provides a method for reverse engineering of a module, e.g. a PEA, based on module-related data such as the MTP and related operation data. The methods and systems disclosed herein are especially useful for brownfield projects and old PEAs, for which a control system replacement is needed. Since the control logic from the control system inside the PEA is not known, the methods and systems disclosed herein are provided in order to find out what functionality is implemented and how the PEA behaves in a process.

As used herein, "inferring" relates to deducing, deriving, determining or identifying information, consequences, causes and effects, and logical conclusions from the runtime data using an algorithm, especially a rule-based algorithm, as described herein.

The "module-related data" may comprise data relating to static and/or dynamic aspects of the module and its services, states, and equipment, including for example data relating to inputs and outputs, communications HMI, tags, parameters, alarms, control logic. The module-related data may for example comprise an MTP.

The "runtime data" may comprise any prior or historical data relating to prior use of the module. This data may be stored in the module itself or in a control system.

The "equipment" comprises the means whereby the module influences or controls the manufacturing process, e.g. a chemical process, any may comprise for example actuator-based equipment such as valves or non-actuable equipment such as heaters, coolers, and so on. Correspondingly, the equipment can be put into one or more "equipment states" whereby its influence on the manufacturing process can be varied. The equipment state may comprise an actuator state such as position, speed, and so on, as well as other states such as on, off, and power settings.

The "equipment state transition conditions" denote those circumstances, stimuli or triggers (including but not limited to actions by sensors or actuators plus all commands) that cause or lead to a change in equipment state, i.e., that cause the control logic of the module to instruct the equipment to transition from one equipment state to another. Two exemplary forms of equipment state transition conditions are the service state entry actions and the process conditions (e.g., level>x→valve is closed) as described herein. Further examples include other equipment state changes (e.g., actuator state changes such as valve is closed→pump has to stop), and safety switches (e.g., gas pressure switch is going on (true)→release valve is opened, light the flare).

For example, a service state transition may serve as an equipment state transition condition. The runtime data may further include tags indicating a service state of at least one service performed by the module at the plurality of timepoints, and the inferring may comprise identifying a transition from a first service state to a second service state as being a said equipment state transition condition causing the equipment to transition from the first equipment state to the second equipment state. By "service" is meant herein a function or functionality performed by the module. The transition from the first service state to the second service state may give rise to one or more entry actions, as described further below. To discover entry actions, the method may comprise identifying changes in equipment states following entry to the second service state, for example by identifying entries in the runtime data corresponding to timepoints preceding and following the transition from the first service state to the second service state, comparing equipment states in the identified entries, and identifying differences between the equipment states as equipment state transitions to be implemented upon entry to the second service state.

Additionally or alternatively, a process condition may serve as the equipment state transition condition. By "process condition" is meant a particular value (i.e. setpoint), trend, or other identifiable characteristic in the measured process values which, when detected by the control logic, may cause the same to instruct equipment state transitions. Again, where the runtime data further includes one or more process values measured at each of the plurality of timepoints, the inferring may comprise identifying, from the one or more measured process values, a process condition as being a said equipment state transition condition causing the equipment to transition from the first equipment state to the second equipment state. The process condition may be identified using a rule-based algorithm. For example, for identifying process conditions leading to equipment state transitions, the method may comprise identifying an entry in the runtime relating to a final timepoint at which the first equipment state was active, inspecting process values in the identified entry and in one or more further entries surrounding the identified entry to identify a relevant process parameter, and defining the process condition on the basis of the process value measured for the relevant process parameter in the identified entry. The relevant process parameter may be identified by identifying characteristics such as trends in the process values in the identified entry and one or more surrounding entries. The rule-based algorithm may be used to identify the relevant parameter. For example, one rule may state that, where a trend in the process values for one parameter deviates from trends in the process values of other parameters, the process parameter with the deviating trend is identified as the relevant process parameter. A further rule may state that, where the trend in the process values for one process parameter changes while trends in the process values for other process parameters remain unchanged, the process parameter with the changing trend is identified as the relevant process parameter. More generally, the relevant process parameter may be identified by identifying a non-linearity in the process values for that process parameter. More particularly, one rule may state that, where process values for one process parameter are increasing or decreasing while process values for other parameters remain constant (within, e.g., a predetermined variability threshold), the process parameter with changing process values is identified as the relevant process parameter. A further rule may state that, where process values for one parameter cease to increase or decrease, or reach a turning point, while process values for other parameters either remain constant or continue increasing or decreasing, the process parameter whose process values ceased to change (or reached a turning point) is identified as the relevant process parameter. Further rules may identify the relevant process parameter on the basis of deviations between the rates of change in the process values, or on the basis of changes to the rate of change in the process values. The rule-based algorithm may further comprise rules for defining the process condition on the basis of the process value in the identified entry and on the rule used to identify the relevant process parameter. For example, where the relevant process parameter is identified on the basis of its process values increasing or decreasing while process values for other parameters remain constant, or where the relevant process parameter is identified on the basis of its process values ceasing to increase or decrease while process values for other parameters either remain constant or continue increasing or decreasing, the rule-based algorithm may define the process condition as PP>=PV or PP<=PV, for increasing and decreasing process values, respectively, or process values which ceased to increase or decrease, respectively, where PP is the relevant process parameter and PV is the process value in the identified entry. It will be appreciated that further rules are possible and that these may be added to the rule-based algorithm by an engineer.

A general rule-based algorithm for inferring process conditions may execute one or more of the following steps: 1. The algorithm finds process values that change their behaviour, by means of going from continuous increase into a constant state or decrease (e.g., finding non-linearities). 2. At or around the timepoint at which the process value changed its behaviour, inspect the equipment (e.g., actuators) to identify which equipment changed its equipment state at or around the same time. 3. These pieces of equipment are identified as being the most likely ones which influenced the process value. Those pieces of equipment can be filtered (re-evaluated) for example by finding other process values that changed their behaviour at or around the same timepoint. Additionally, other such timepoints at which the same behaviour change was recognized may be identified and compared to identify which pieces of equipment changed their state at all of these timepoints. Other cross-checks may be performed such as using correlations between the process values and equipment states or using other process values.

Equipment state transition conditions may be inferred per service or for combinations of services. For example, the method may comprise performing the inferring separately for each of a plurality of services performed by the module so as to infer per-service equipment state transition conditions. Additionally or alternatively, the method may comprise performing the inferring in relation to combinations of a plurality of services performed by the module so as to infer combined-service equipment state transition conditions.

Process conditions may also give rise to transitions in the service state. For example, where the runtime data further includes one or more process values measured at each of the plurality of timepoints, the method may further comprise inferring, from the one or more process values, one or more process conditions (as service state transition conditions) that cause a service performed by the module to transition from a first service state to a second service state. A rule-based algorithm may again be used to identify the process conditions. For example, for identifying process conditions leading to service state transitions, the method may further comprise identifying an entry in the runtime relating to a final timepoint at which the first service state was active, inspecting process values in the identified entry and in one or more further entries surrounding the identified entry to identify a relevant process parameter, and defining the service state transition condition on the basis of the process value measured for the relevant process parameter in the identified entry. The relevant process parameter may be identified in the same manner as described above.

Aside from equipment state transition conditions, other conditions such as alarm conditions may be inferred from the runtime data. For example, where the runtime data further includes one or more process values measured at each of the plurality of timepoints, the method may further comprise inferring, from the one or more process values, one or more process conditions that trigger an alarm.

The method may comprise identifying default equipment states. For example, where the runtime data further includes tags indicating a service state of each of one or more services performed by the module at the plurality of timepoints, the method may further comprise identifying, using the tags, one or more idle timepoints at which each of the one or more services is in an idle state, and identifying the equipment state at the idle timepoints as being a default equipment state. For expediency, the method may further comprise excluding runtime data collected at the idle timepoints from the module-related data when performing the inferring.

The method may further comprise determining a mapping between service states and equipment states for one or more services of the module. Determining the mapping may comprise determining which of the plurality of pieces of equipment is used in which of a plurality of service states of a said service performed by the module, and/or identifying possible equipment states of each of the plurality of pieces of equipment in each of the plurality of service states.

The method may further comprise identifying conflicting equipment states among a plurality of services performed by the module and generating an interlock rule preventing the conflicting services from being performed in parallel.

Inferences may be refined to improve accuracy. For example, accuracy may be increased where the runtime data relates to further timeperiods in which the service transitions from the first service state to the second service state, with the method optionally further comprising refining the inference of the one or more service state transition conditions on the basis of the runtime data relating to the further timeperiods. Additionally or alternatively, where the runtime data relates to further timeperiods in which the equipment of the module transitions from the first equipment state to the second equipment state, the method may further comprise refining the inference of the one or more equipment state transition conditions on the basis of the runtime data relating to the further timeperiods. Refining may include for example averaging by taking e.g. a moving average of the process values across the multiple timeperiods relating to the same transition.

The control logic reverse engineered in the manner described may be applied in any number of ways. In one example, the method may comprise obtaining the module-related data at least partly from a configuration file defining the configuration of the module, and using the module-related data to create a frame for control software configured to implement the reverse engineered control logic. The method may further comprise representing the reverse engineered control logic in an engineering tool used for configuring the modular industrial plant, for example using a cause-and-effect matrix. The "configuration file" may be a description file describing the module, for example a Module Type Package (MTP) defining the module and its configuration (e.g. a Process Equipment Assembly or PEA). The configuration file may be target system independent. The configuration file may also comprise one or more files taken from an engineering library. The "engineering tool" may be implemented in software to provide a tool for configuring the modular plant. A corresponding software package may be provided. Functionality of the engineering tool may be accessible via or provided by one or more views or facilities. The engineering tool may have one or more environments. The engineering tool may provide functionality to enable the frame (frame program) to be created. A frame is a reusable, machine-adaptable building block for manufacturing custom software. As described below, the reverse engineering control logic of the module is added to the frame. This may be performed via or with help from the cause-and-effect matrix. When all reverse engineered logic has been added to the frame by the algorithm, the engineer may add further logic relating to missing states never reached in the runtime data. The frame can then be used to manufacture control software for replacing the control system of the module.

According to a second aspect, there is provided a computing device comprising a processor configured to perform the method of the first aspect.

According to a third aspect, there is provided a computer program product comprising instructions which, when executed by a computing device, enable the computing device to carry out the method of the first aspect.

According to a fourth aspect, there is provided a computer-readable medium comprising instructions which, when executed by a computing device, enable the computing device to carry out the method of the first aspect.

In the context of the present disclosure, the terms "module", "unit", and "PEA" are used interchangeably.

The invention may include one or more aspects, examples or features in isolation or combination whether or not specifically disclosed in that combination or in isolation.

These and other aspects of the invention will be apparent from and elucidated with reference to the embodiments described hereinafter.

FIG. 1 shows a modular industrial plant 100 comprising an orchestration layer 102 and a module layer 104. The orchestration layer 102 comprises an operations desk 106 including a monitoring dashboard and a supervisory control system 108. Although the operations desk 106 and supervisory control system 108 are shown as two separate entities, it will be appreciated that these entities may be provided by a centralized control system or by a distributed control system. The module layer 104 comprises a plurality of modules 110 each described by a configuration file in the form of a Module Type Package or MTP 112, described further below. Each module 110 comprises a controller executing control logic (automation logic) for the module. Each module 110 provides a set of encapsulated process functions, called services, such as mixing, tempering or heating that can be orchestrated by the supervisory control system 108. The modules 110 are integrated into the plant 100 via the orchestration layer 102. Communications between entities in the orchestration layer 102 and module layer 104 take place via an architecture network 114 using the OPC UA protocol (OPC Unified Architecture, a machine-to-machine communication protocol for industrial automation developed by the OPC Foundation). Each module 110 comprises an OPC UA server which exposes the module's services and tags to the supervisory control system 108. The supervisory control system 108 comprises an OPC UA client which connects to the modules' OPC UA servers to communicate commands to the modules 110. By controlling the services in the right way, the orchestration layer 102 ensures that the modules 110 work together to fulfil the requirements of the plant 100.

Module Type Package (MTP) is a standard for modular automation systems which creates a framework for interoperability between the orchestration layer 102 and the module layer 104, allowing industrial process plants to be built up and engineered in a modular way, with the goal of simplifying process plant engineering and life cycle management. These advantages are realized by the prefabricated and well-tested modules 110, which may also be called PEAs (Process Equipment Assembly) that can easily be put together in different combinations so that different recipes can be realized. Each MTP 112 provides a module type description. The MTP 112 may define, for example, one or more of (i) communications with the module; (ii) the human-machine interface (HMI) of the module; (iii) definitions of tags used by the module; (iv) definitions of services and service parameters provided by the module (for example definitions of the automation logic using e.g. state machines); (v) alarm management procedures used by the module; (vi) safety aspects. The HMI consists of symbols and lines that visualize the equipment and the process flow, for example in the form of a P&ID (piping and instrumentation diagram). Each symbol, parameter and so on is tagged and a tag list is provided, as is known in the art. From the MTP 112, control software for the module 110 may be automatically generated, to be executed by the module's controller.

As mentioned above, control system replacement is sometimes needed, for example in brownfield projects. Since the control logic from the control system inside a module 110 may not be known, methods and systems are provided by the present disclosure for reverse engineering the control logic.

A preliminary step to the reverse engineering comprises creating a frame for the control software of the module 110 to be reverse engineered in an engineering tool using the MTP 112 of the module. The engineering tool takes all information from the MTP 112 including the P&ID as well as the HMI, the services and service parameters, the control equipment and tags and adds it to the engineering tool. The HMI part of the MTP 112 is used to create the P&ID like topology in the engineering tool. When the MTP 112 contains connection points between the symbols, those are used as connection points in the HMI. If optional connection points are not present in the MTP 112, they can be re-evaluated for the P&ID and be added in this step. The services are identified, and the service parameters are identified. All services are added in the engineering tool and the corresponding parameters are added. The tags belonging to the module are identified and the connection to the HMI is done. Additionally, the default values for the tag parameters are read from the MTP 112 and added in the tag list configuration. The alarms that are described in the MTP 112 are added to the alarm list. This includes service alarms, as well as tag alarms. Additionally, the alarm relations (first-up alarms, connections between alarms, causality chains between alarms) are added in the engineering tool. Vendor dependent information such as OPC UA nodes, serial numbers, system alarms may be ignored, because they are not needed in the final configuration.

Since the MTP 112 does not include any information about the control system behaviour inside a service, the interlocks between equipment, and so on, runtime data from the module 110 (with the module having been previously used) is used to reverse engineer this behaviour, as described below, by inferring dependencies between the tags, actuation state and the services and states. Since the structure of the control logic is already known from the services and tags described in the MTP 112, only the interior needs to be reverse engineered.

Figure 2:
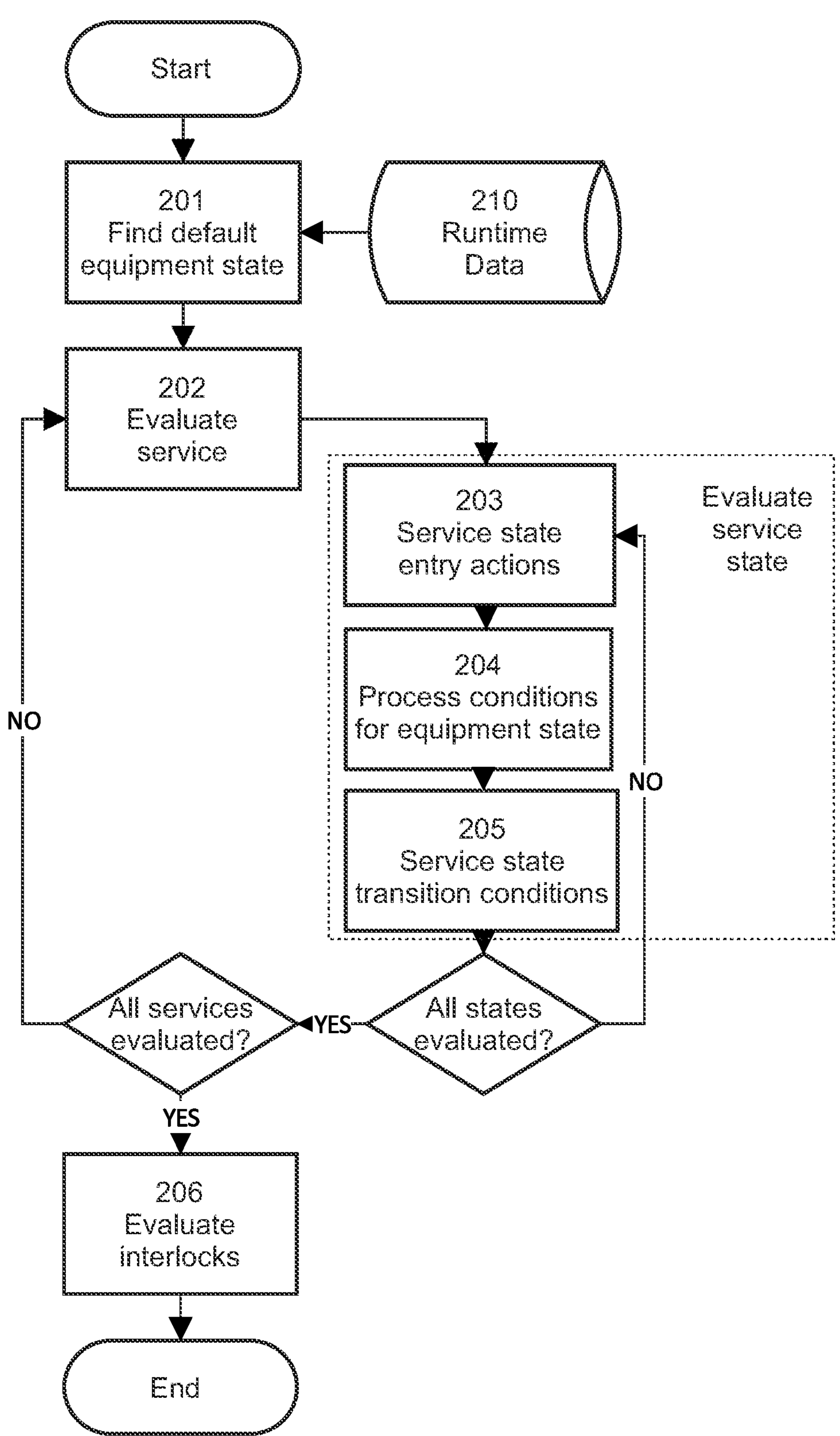
FIG. 2 is a flowchart illustrating a method of reverse engineering control logic of a module for a modular industrial plant.

With reference to FIG. 2, a method of reverse engineering control logic of a module 110 for the modular industrial plant 100 will now be described, in which the reverse engineering of a module's control function is performed in a stepwise approach using runtime data 210. The method is performed by a reverse engineering algorithm running for example as part of the engineering tool, which may be implemented using the computing device described below. All information gained using this method is added to the engineering tool. The method takes a structured data analysis approach in order to create code for the service execution and the tag connection. For each state of each service, specific timepoints are taken (e.g. when the service is started and executes the service state "STARTING"). For these timepoints, the runtime data 210 is evaluated for actions taken by the equipment of the module 110, e.g. valves opening or pumps starting. The runtime data 210 that is evaluated includes that portion (i.e. a single entry or a set of entries) which was collected while the service was in this state. Based on this portion of runtime data 210, the behaviour of the service is reconstructed. For every service state, the actuator states and process values are evaluated and the influence of the service on the module 110 is determined. Additionally, account is taken of which services are executed at the same time. Equipment (e.g. actuator) states can therefore be assigned to specific services and specific service states, operation modes of equipment can be discovered and process values and their influence on the module 110 can be reverse engineered. Operation modes of equipment define by whom or what the equipment is controlled, for example by an automation system without user interaction or directly by the user (the engineer opens and closes the valves, for example). This information is present in the automation system. Only when the equipment is in automatic mode is the service allowed to control the equipment. Operation modes may be taken into account by the algorithms described herein when evaluating the runtime data. For example, equipment state changes occurring in the manual operation mode may be discounted by the algorithm.

The method comprises deriving, from the runtime data 210, information relating to one or more of the following: (i) which actuator is used in which service and in which service state; (ii) which actuators are used in several services and service states; (iii) the state of the actuators in the specific services and service states; (iv) process conditions that lead to an actuation in a certain service and service state; (v) influence of the service parameters on the actuator states; (vi) process conditions that lead to tag and service alarms; (vii) process conditions that lead to a state change within a service. The derived information can be used to fill cause-and-effect sheets in the engineering tool thereby to describe the control logic that is executed within a service and its states. A cause-and-effect sheet (also referred to herein as a cause-and-effect matrix) may be used to represent the internal implementation of a service inside the frame. For one or more states of one or more services (e.g. for every state of every service), a cause-and-effect sheet might exist. In the sheet, it is shown for example that a valve shall be closed if a level is too high, or the entry actions performed when entering a service state are described, or the like. According to the present disclosure, such sheets are automatically generated using the knowledge inferred from the runtime data. The cause-and-effect sheet may or may not be validated by a user before being used to describe the control program.

In step 201 ("Find default equipment state"), the method comprises finding the default actuator states. The default actuator states are those which are used when all services of the module 110 are in the IDLE state. At such timepoints, no action is performed inside the module 110, which means all actuators are in a default state. For finding these states, the runtime data 210 is searched for all entries relating to timepoints at which the services are all in the IDLE state. In order to find these entries, the algorithm inspects all services and their state. When a timepoint is found at which all services are in the IDLE state, the corresponding entry is selected by the algorithm for evaluation. For all entries found in this way, the algorithm compares the actuator states. When an actuator state is discovered (e.g. a valve is closed) that appears in all the entries selected for evaluation, then this is identified by the algorithm as being a default actuator state of the module 110. When all actuator states are evaluated and all entries are evaluated, all default actuator states are known.

Table 1 below provides examples of runtime data entries used in the evaluation of default actuator states.

| Time | Service 1 - state | Service 2 - state | Valve 1 | Valve 2 | Valve 3 |
|---|---|---|---|---|---|
| 0 | RESETTING | IDLE | OPEN | CLOSED | CLOSED |
| 1* | IDLE | IDLE | CLOSED | CLOSED | OPEN |
| 2* | IDLE | IDLE | CLOSED | CLOSED | OPEN |
| 3* | IDLE | IDLE | CLOSED | CLOSED | OPEN |
| 4* | IDLE | IDLE | CLOSED | CLOSED | OPEN |
| 5 | IDLE | STARTING | CLOSED | OPEN | CLOSED |
| 6 | IDLE | EXECUTE | OPEN | OPEN | CLOSED |
| 7 | IDLE | COMPLETED | OPEN | CLOSED | CLOSED |
| 8* | IDLE | IDLE | CLOSED | CLOSED | OPEN |
| 9* | IDLE | IDLE | CLOSED | CLOSED | OPEN |
| 10* | IDLE | IDLE | CLOSED | CLOSED | OPEN |

The runtime data 210 is shown here over a measured timeperiod including timepoints 0-10 (these numbers are symbolic and provided for illustration only). Those timepoints marked with asterisks (*) relate to entries in which all services are in the IDLE state. These entries are selected by the algorithm for the evaluation of default actuator states. It is shown that, at all timepoints at which all services are in the IDLE state, the actuator states are: Valve 1→CLOSED, Valve 2→CLOSED, Valve 3→OPEN. These are therefore identified by the algorithm as being the default actuator states for the module 110.

In step 202 ("Evaluate service"), a service is evaluated. To that end, all entries that belong to the service may be selected by the algorithm for evaluation, or, to reduce the dataset, only those entries in the runtime data 210 relating to timepoints at which the selected service was not in the IDLE state may be selected for evaluation.

Table 2 below shows a further example of runtime data 210 used to evaluate a service.

| Time | State | External command | Valve 1 | Valve 2 | Valve 3 | Level 1 [%] | Pressure 1 [bar] |
|---|---|---|---|---|---|---|---|
| 0 | IDLE | | CLOSED | CLOSED | OPEN | 0 | 1 |
| 1 | IDLE | START | CLOSED | CLOSED | OPEN | 0 | 1 |
| 2 | STARTING | | CLOSED | OPEN | OPEN | 0 | 1 |
| 3 | STARTING | | CLOSED | OPEN | OPEN | 10 | 1.2 |
| 4 | STARTING | | CLOSED | OPEN | OPEN | 22 | 1.5 |
| 5 | STARTING | | CLOSED | OPEN | CLOSED | 22 | 1.9 |
| 6 | STARTING | | CLOSED | OPEN | CLOSED | 22 | 2 |
| 7 | STARTING | | CLOSED | OPEN | CLOSED | 22 | 2.5 |
| 8 | EXECUTE | | OPEN | CLOSED | CLOSED | 21 | 2.5 |
| 9 | EXECUTE | | OPEN | CLOSED | CLOSED | 22 | 2.5 |
| 10 | EXECUTE | | OPEN | CLOSED | CLOSED | 21 | 2.5 |

As can be seen, the entries corresponding to timepoints 2-10 contain runtime data that were measured while the service was not in the IDLE state and are therefore selected by the algorithm for evaluation. It should be noted that the timepoints included in Table 2 are again symbolic and do not necessarily correspond to those given in Table 1.

Steps 203-205 comprise evaluating a service state of the selected service.

In step 203 ("Service state entry actions"), the algorithm identifies service state entry actions. Firstly, all entries in the runtime data 210 are selected that belong to the service state being evaluated. For example, as shown in Table 2, a first set of entries for the STARTING state of the service is evaluated, followed by another set of entries for the EXECUTE state. For each service state, entry actions for the service state are evaluated. Whenever a service changes its state, an entry action can be performed when the subsequent service state is entered. Such service state entry actions can be discovered by inspecting the first entry in the set that belongs to the service state being evaluated. In the example shown in Table 2, the STARTING state of the service is entered at timepoint 2. The entry corresponding to timepoint 2 shows what happens when the STARTING state is entered: in this case, valves 2 and 3 are OPEN and valve 1 is CLOSED. These actuator states are compared to the states of the actuators in the previous service state (in this example, the IDLE state). The actuator states that differ from the preceding service state are those that must be set in the entry actions performed when entering the service state. The algorithm thus infers that, in the example for the STARTING state, valve 2 must be opened while the remaining actuators remain unchanged. The inferred service state entry actions may be entered in the cause-and-effect matrix to show the reverse engineered configuration of the service state. Since the entry actions cause a change in actuator state, they form one example of the actuator state transition conditions described herein.

Step 204 ("Process conditions for equipment state") comprises identifying process conditions that lead to actuator state transitions, for reverse engineering of actuator state changes within a service state based on the process values. While the service is in a particular state, actuators might change positions, speed, etc. Usually, that happens because of certain process conditions becoming true. In this step, the algorithm checks for these changes and the corresponding process conditions. For example, Table 2 shows at timepoint 5 that there was a changing actuator—here, valve 3 was closed—while the service was in the STARTING state. Additionally, at timepoint 4, certain process values were measured: level 1 was 22% and pressure 1 was 1.5 bar. When comparing the timepoints 4 and 5, it can be seen that the level was constant, while the pressure was increasing. Therefore, the algorithm infers that closing valve 3 has an influence on the level. Furthermore, the algorithm infers that level 1 has reached a setpoint that led to the closing of valve 3. This allows the algorithm to infer an actuator state transition condition (here, in the form of a process condition), namely level 1>=22%, that led to the actuator change in which valve 3 was closed. The inferred actuator state transition conditions (process conditions) may again be entered in the cause-and-effect matrix.

In step 205 ("'Service state transition conditions"), service state transition conditions are evaluated. Service state transition conditions are those which apply at the final timepoint in the set at which the service state was active. Thus, the final entry in the set of entries for the service state is selected for evaluation. The algorithm determines whether an external command for service state change was given. If the runtime data 210 includes no such final entry in a set pertaining to the service state in which no command for service state change was given (or, in other words, if every transition out of this service state was caused by an external command), the algorithm identifies that there is no automatic transition from the current service state to the subsequent service state. Regarding those entries in which an automatic service state transition was performed, the subsequent service state is identified. In the example shown in Table 2, the subsequent service state is EXECUTE and the transition occurs at timepoint 7 (at timepoint 8, the EXECUTE state has already been reached). This means that the process conditions at timepoint 7 led to a transition from the STARTING state to the EXECUTE state. In order to find the process condition that led to the service state change, the algorithm inspects the process values. In Table 2, level 1 remains constant, whereas the pressure was rising before the service state change and remains constant afterwards. Hence, the algorithm infers that the pressure is the process condition for the service state change. Thus, the algorithm infers that the service state change to transition from STARTING to EXECUTE is performed when the pressure 1>=2.5 bar. The inferred service state transition conditions can again be inserted into the cause-and-effect matrix.

Following step 205, a determination is made as to whether all states of the service being evaluated have been evaluated. If not, the method returns to step 203 to evaluate the next identified state of that service. Otherwise, the method proceeds to determine whether all services of the module 110 have been evaluated. If not, the method returns to step 202 to evaluate the next identified service of the module 110. Otherwise, the method proceeds to step 206.

In step 206 ("Evaluate interlocks"), interlocks for services are evaluated. All generated information about the control code is taken and conflicting actuator states of different services are evaluated. For example, when service 1 needs valve 1 to be OPEN in the EXECUTE state and service 2 needs valve 1 to be CLOSED in the EXECUTE state, the two services are not allowed to run in parallel. Therefore, the algorithm generates an interlock, which may be added in the engineering tool.

The algorithm may further evaluate alarms for the module 110 to reverse engineer the alarm logic of the module 110. This may be performed in the manner described above, based for example on alarm history data for states of services. The algorithm may thus determine process conditions that led to an alarm and may further evaluate connections between service alarms and tag alarms. The inferences may again be added to the cause-and-effect matrix. An alarm configuration for the module 110 may then be generated.

The algorithm may evaluate combinations of services. Changing actuators may not necessarily indicate that the change was triggered from within a state: the change might be triggered from another service running in parallel. If the algorithm identifies that several services were running in parallel in a portion of the runtime data 210, the algorithm may either ignore that portion of runtime data or compare the portion to other portions of runtime data 210 pertaining to individual operation of one or more of the services to identify differences for use in the evaluation of the service states.

In the evaluation of process conditions and/or service state transition conditions described above, the algorithm may determine more accurate process and/or service state transition conditions by comparing several sets of runtime data 210 for a particular state where process values lead to a change in actuator state or service state, respectively. For example, the process values used in determining the process condition may be averaged over the multiple data sets. A moving average may be used.

The algorithm may additionally discover service parameter conditions by inspecting service parameter changes and identifying correlations between service parameters and process parameters. A service can have parameters to further specify its behaviour. These may for example relate to setpoints for controllers in the plant. For example, a service tempering might have a parameter temperature. The temperature parameter is given by the process orchestration layer of the plant in order to indicate to the service which temperature is needed. Depending on that parameter value, the behaviour of process values might be different. When the temperature value is increasing and then at some timepoint becomes constant, this might indicate the influence of the parameter value. If, in one timeperiod, the parameter value was 80° C. and the temperature measurement is maintained constant when reaching 80° C. and, in another timeperiod, the parameter was 60° C. and the temperature is maintained constant afterwards at 60° C., the algorithm may recognize (again using a rule-based approach) that the temperature setpoint is set by the service parameter. This information is then used to generate the corresponding cause-and-effect matrix entries for the assignment of the temperature setpoint of the internal measurement to the parameter temperature of the service (direct correlation). It is also envisaged by the present disclosure that the algorithm may identify a correlation between the parameter value and the setpoint for the process value on the basis of one or more intermediate mathematical operations.

Using the algorithm described herein, design issues may be uncovered. For example, a default actuator (e.g. valve) state cannot be found, because the actuator state differs in different data sets.

The present disclosure further provides for reverse engineering of the HMI, including connection points if these are missing in the MTP 112. This may include reverse engineering of the HMIs symbols, connections, and/or pipes, and reverse engineering of the connection points of the symbols and creation of the HMI in the engineering tool, based on the MTP 112. The MTP 112 describes where the symbols are placed on the HMI and how these symbols should appear. There is also an option to describe connections between symbols but this is not mandatory. The present disclosure thus provides an algorithm configured to generate the connection points for the HMI symbols from a given MTP 112 that does not contain the connection points. The algorithm may comprise any one or more of the following steps. Step 1: get the symbols. Step 2: get the dimensions of the symbols (e.g. height, width, etc.) and create surrounding rectangles. Step 3: check the lines (pipes, measurement lines also described in the MTP 112) for overlaps with the surrounding rectangles of the symbols. Step 4: if there is an overlap, create a connection point and the additional information regarding the connection in the MTP 112.

Figure 3:
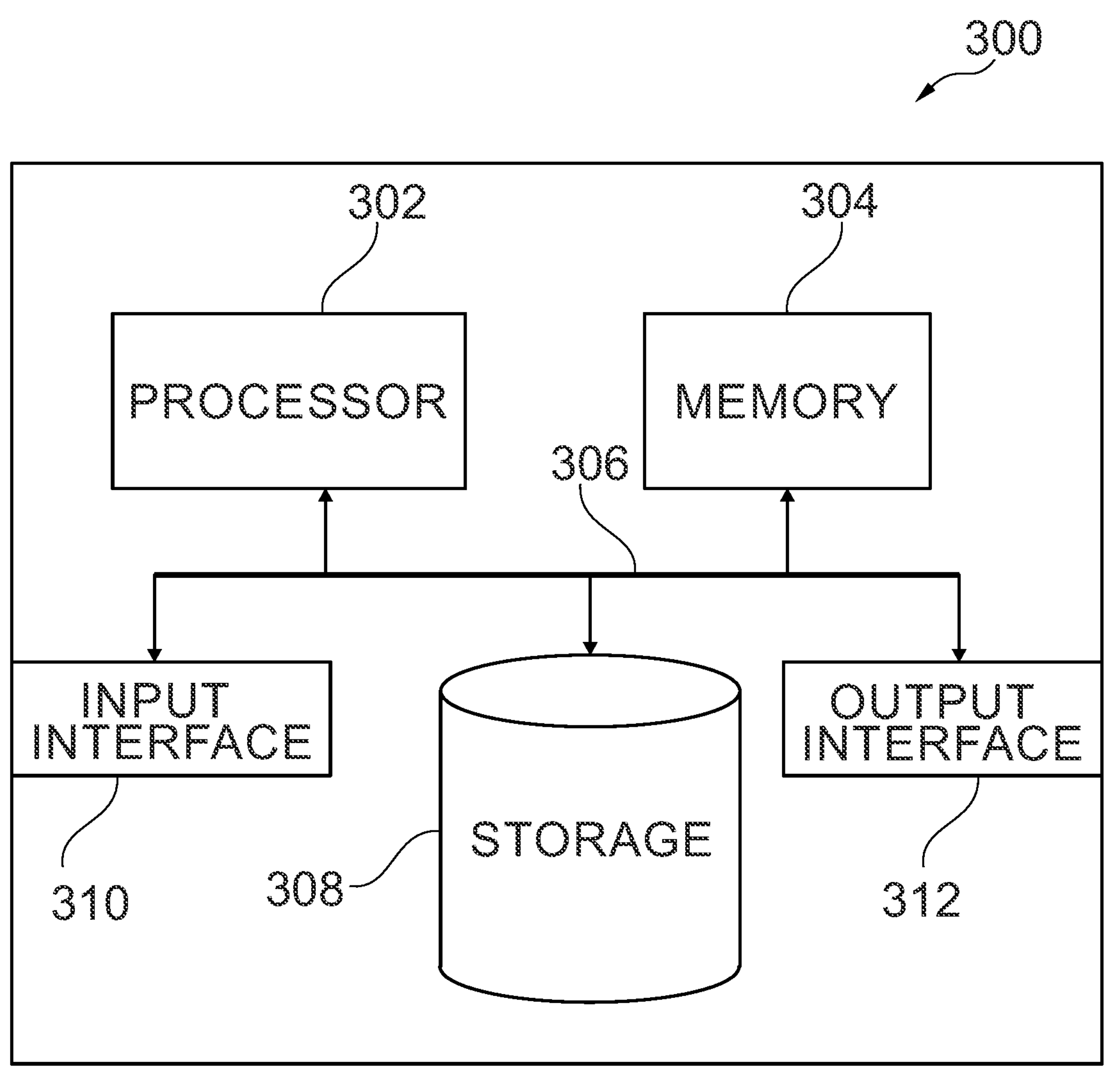
FIG. 3 illustrates a computing device that can be used in accordance with the systems and methods disclosed herein.

Referring now to FIG. 3, a high-level illustration of an exemplary computing device 300 that can be used in accordance with the systems and methodologies disclosed herein is illustrated. In particular, the computing device 3000 may be used to implement the above-described engineering tool. The computing device 300 includes at least one processor 302 that executes instructions that are stored in a memory 304. The instructions may be, for instance, instructions for implementing functionality described as being carried out by one or more components discussed above or instructions for implementing one or more of the methods described above. The processor 302 may access the memory 304 by way of a system bus 306. In addition to storing executable instructions, the memory 304 may also store conversational inputs, scores assigned to the conversational inputs, etc.

The computing device 300 additionally includes a data store 308 that is accessible by the processor 302 by way of the system bus 306. The data store 308 may include executable instructions, log data, etc. The computing device 300 also includes an input interface 310 that allows external devices to communicate with the computing device 300. For instance, the input interface 310 may be used to receive instructions from an external computer device, from a user, etc. The computing device 300 also includes an output interface 312 that interfaces the computing device 300 with one or more external devices. For example, the computing device 300 may display text, images, etc. by way of the output interface 312.

It is contemplated that the external devices that communicate with the computing device 300 via the input interface 310 and the output interface 312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 300 may be a distributed system. Thus, for instance, several devices may be in communication by way of a network connection and may collectively perform tasks described as being performed by the computing device 300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While there have been shown and described and pointed out fundamental novel features of the invention as applied to one or more embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

While one or more embodiments of the invention have been illustrated and described in detail in the drawings and foregoing description, such illustration and description are to be considered exemplary and not restrictive. The invention is not limited to the disclosed embodiments.

Other variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used advantageously. A computer program may be stored/distributed on a suitable medium, such as an optical storage medium or a solid-state medium supplied together with or as part of other hardware, but may also be distributed in other forms, such as via the internet or other wired or wireless communications systems. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for reverse engineering control logic of a module for a modular industrial plant, the method comprising:

obtaining module-related data including runtime data relating to prior use of the module during a timeperiod, wherein during the timeperiod at least one piece of equipment of the module transitions from a first equipment state to a second equipment state, the runtime data including tags indicating the equipment state of the equipment at a plurality of timepoints during the timeperiod, wherein the equipment includes an actuator;

inferring from the module-related data one or more actuator state transition conditions causing the actuator to transition from the first state to the second state, wherein causing the actuator to transition from the first state to the second state comprises:

determining a default state for the actuator;

evaluating a current service that includes the actuator, wherein evaluating the current service includes comparing the second state of the actuator in the current service with the first state in a previous service; and identifying process conditions leading to the transition of the actuator from the first state to the second state, wherein the process conditions are used to generate the reverse engineering control logic of actuator state changes within the current service based on the process conditions;

creating a frame using an engineering tool for control software configured to implement the reverse engineering control logic based on the inferred module-related data, wherein further logic relating to transition states that are not reached in the runtime data is added to the reverse engineering control logic, wherein the frame is a machine-adaptable building block for manufacturing custom software, and wherein the reverse engineering control logic is added to the frame;

utilizing the reverse engineering control logic in the engineering tool to reverse engineer actuator states based on the process conditions; and utilizing the frame created using the engineering tool to manufacture control software to replace a control system of the module, and executing the manufactured control software in the control system of the module to control and cause the actuator to transition between the first equipment state and the second equipment state under the identified process conditions.

2. The method of claim 1, wherein the runtime data further includes tags indicating a service state of at least one service performed by the module at the plurality of timepoints, and wherein the inferring comprises identifying a transition from a first service state to a second service state as being a said equipment state transition condition causing the equipment to transition from the first equipment state to the second equipment state.

3. The method of claim 1, wherein the runtime data further includes one or more process values measured at each of the plurality of timepoints, and wherein the inferring comprises identifying, from the one or more measured process values, a process condition as being a said equipment state transition condition causing the equipment to transition from the first equipment state to the second equipment state.

4. The method of claim 1, comprising performing the inferring separately for each of a plurality of services performed by the module so as to infer per-service equipment state transition conditions.

5. The method of claim 1, comprising performing the inferring in relation to combinations of a plurality of services performed by the module so as to infer combined-service equipment state transition conditions.

6. The method of claim 1, wherein the runtime data further includes tags indicating a service state of each of one or more services performed by the module at the plurality of timepoints, the method further comprising identifying, using the tags, one or more idle timepoints at which each of the one or more services is in an idle state, and identifying the equipment state at the idle timepoints as being a default equipment state.

7. The method of claim 6, further comprising excluding the runtime data collected at the idle timepoints from the module-related data when performing the inferring.

8. The method of claim 1, further comprising determining a mapping between service states and equipment states for one or more services of the module.

9. The method of claim 1, wherein the runtime data further includes one or more process values measured at each of the plurality of timepoints, the method further comprising inferring, from the one or more process values, one or more process conditions that trigger an alarm.

10. The method of claim 1, wherein the runtime data further includes one or more process values measured at each of the plurality of timepoints, the method further comprising inferring, from the one or more process values, one or more service state transition conditions that cause a service performed by the module to transition from a first service state to a second service state.

11. The method of claim 1, comprising obtaining the module-related data at least partly from a configuration file defining the configuration of the module, and using the module-related data to create a frame for control software configured to implement the reverse engineered control logic.

12. The method of claim 1, further comprising identifying conflicting equipment states among a plurality of services performed by the module and generating an interlock rule preventing the conflicting services from being performed in parallel.

13. The method of claim 1, wherein the runtime data relates to further timeperiods, wherein during the further timeperiods the at least one piece of equipment of the module transitions from the first equipment state to the second equipment state, the method further comprising refining the inference of the one or more equipment state transition conditions on the basis of the runtime data relating to the further timeperiods.

14. A computer comprising a processor configured to perform the method of claim 1.

15. A non-transitory computer-readable medium comprising instructions which, when executed by a computer, enable the computer to carry out the method of claim 1.

16. The method of claim 1, wherein the engineering tool is a cause-and-effect matrix.

17. The method of claim 16, wherein the cause-and-effect matrix is used to represent an internal implementation of a service inside the frame.

18. The method of claim 17, wherein the inferred state transition conditions are provided to the cause-and-effect matrix to show the reverse engineering control logic associated with the inferred state transition.

* * * * *